United States Patent
Liu

(10) Patent No.: US 10,979,193 B2
(45) Date of Patent: Apr. 13, 2021

(54) SIGNAL TRANSMISSION METHOD, NETWORK DEVICE, AND TERMINAL DEVICE

(71) Applicant: HUAWEI TECHNOLOGIES CO., LTD., Guangdong (CN)

(72) Inventor: Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/502,956

(22) Filed: Jul. 3, 2019

(65) Prior Publication Data

US 2019/0327060 A1    Oct. 24, 2019

Related U.S. Application Data

(63) Continuation of application No. PCT/CN2017/116912, filed on Dec. 18, 2017.

(30) Foreign Application Priority Data

Jan. 6, 2017    (CN) .......................... 201710011310.7

(51) Int. Cl.
   *H04J 3/06*    (2006.01)
   *H04L 5/00*    (2006.01)
   (Continued)

(52) U.S. Cl.
   CPC .......... *H04L 5/0051* (2013.01); *H04L 1/0026* (2013.01); *H04W 24/10* (2013.01); *H04W 72/046* (2013.01); *H04W 80/08* (2013.01)

(58) Field of Classification Search
   CPC .......... H04B 1/18; H04B 7/0417; H04B 7/06; H04B 7/0617; H04B 7/0628;
   (Continued)

(56) References Cited

U.S. PATENT DOCUMENTS 8,588,102 B2 * 11/2013 Hoshino ............... H04L 5/0048
                                                           370/252
9,392,639 B2 *  7/2016 Josiam .................. H04L 5/0048
                        (Continued)

FOREIGN PATENT DOCUMENTS

CN    101816132 A    8/2010
CN    101843062 A    9/2010
(Continued)

OTHER PUBLICATIONS

Office Action issued in Chinese Application No. 201780079857.9 dated May 8, 2020, 20 pages (with English translation).
(Continued)

*Primary Examiner* — Frank Duong
(74) *Attorney, Agent, or Firm* — Fish & Richardson P.C.

(57) ABSTRACT

The present disclosure relates to signal transmission methods, network devices, and terminal devices. One example method includes sending, by a network device, N first reference signals to a terminal device, where N is a positive integer greater than or equal to 1, sending, by the network device, physical layer control signaling to the terminal device, where the physical layer control signaling is used to trigger the terminal device to send a channel quality measurement result of the N first reference signals to the network device, and is used to instruct the terminal device to send M second reference signals to the network device, and M is a positive integer greater than or equal to 1, receiving, by the network device, the channel quality measurement result from the terminal device, and receiving, by the network device, the M second reference signals from the terminal device.

28 Claims, 7 Drawing Sheets

(51) Int. Cl.
*H04L 1/00* (2006.01)
*H04W 24/10* (2009.01)
*H04W 72/04* (2009.01)
*H04W 80/08* (2009.01)

(58) Field of Classification Search
CPC ...... H04B 7/0632; H04B 7/0695; H04B 7/08; H04B 7/088; H04L 1/0026; H04L 5/0051; H04L 25/03; H04L 29/08; H01Q 3/10; H01Q 3/30; H04W 16/28; H04W 24/10; H04W 72/04; H04W 72/046; H04W 80/08; H04W 84/18
See application file for complete search history.

(56) References Cited

U.S. PATENT DOCUMENTS

| | | | | |
|---|---|---|---|---|
| 9,960,830 | B2* | 5/2018 | Yoo | H04L 67/1042 |
| 10,271,223 | B2* | 4/2019 | Yu | H04B 7/0695 |
| 10,306,597 | B2* | 5/2019 | Onggosanusi | H04B 7/0626 |
| 10,680,689 | B2* | 6/2020 | Xia | H04L 5/005 |
| 2009/0046800 | A1 | 2/2009 | Xu et al. | |
| 2009/0093222 | A1 | 4/2009 | Sarkar | |
| 2012/0327876 | A1 | 12/2012 | Ouchi et al. | |
| 2014/0369291 | A1 | 12/2014 | Zhang et al. | |
| 2015/0341096 | A1 | 11/2015 | Gao et al. | |
| 2016/0036511 | A1 | 2/2016 | Ko et al. | |
| 2017/0085303 | A1 | 3/2017 | Chen et al. | |
| 2018/0109304 | A1* | 4/2018 | Wiberg | H04B 7/0695 |
| 2019/0191413 | A1 | 6/2019 | Hoshino et al. | |
| 2019/0222279 | A1* | 7/2019 | Xi | H04W 72/00 |
| 2019/0253108 | A1* | 8/2019 | Zhang | H04B 7/0695 |

FOREIGN PATENT DOCUMENTS

| | | |
|---|---|---|
| CN | 102170330 A | 8/2011 |
| CN | 102291189 A | 12/2011 |
| CN | 102546110 A | 7/2012 |
| CN | 102742343 A | 10/2012 |
| CN | 102804895 A | 11/2012 |
| CN | 103259581 A | 8/2013 |
| CN | 104202073 A | 12/2014 |
| CN | 105052048 A | 11/2015 |
| EP | 2439997 A1 | 4/2012 |

OTHER PUBLICATIONS

PCT International Search Report and Written Opinion in International Application No. PCT/CN2017/116,912, dated Aug. 3, 2018, 17 pages (With English Translation).
Extended European Search Report issued in European Application No. 17889615.5 dated Nov. 26, 2019, 9 pages.

* cited by examiner

SIGNAL TRANSMISSION METHOD, NETWORK DEVICE, AND TERMINAL DEVICE

CROSS-REFERENCE TO RELATED APPLICATIONS

This application is a continuation of International Application No.PCT/CN2017/116912, filed on Dec. 18, 2017, which claims priority to Chinese Patent Application No. 201710011310.7, filed on Jan. 6, 2017. The disclosures of the aforementioned applications are hereby incorporated by reference in their entireties.

TECHNICAL FIELD

The present invention relates to the field of communications technologies, and in particular, to a signal transmission method, a network device, and a terminal device.

BACKGROUND

A communications system usually uses different types of reference signals. One type of reference signals are used for channel quality measurement, for example, measurement related to radio resource management (radio resource management, RRM). This type of reference signals may be a cell-specific reference signal (cell-specific reference signal, CRS), so as to implement user channel quality measurement and cell selection and handover. Another type of reference signals are used for channel state information measurement, so as to schedule a terminal device. The terminal device obtains channel state information based on channel quality measurement of a channel state information-reference signal (channel state information-reference signal, CSI-RS).

To reduce a relatively large propagation loss caused by a relatively high frequency band, a signal (including a reference signal) transmission mechanism based on a beamforming technology is used, and a transmission loss in a signal propagation process is compensated by using a relatively large antenna gain. A beamforming signal includes a first-type cell-specific reference signal or a second-type user-specific reference signal. In addition, a receive beamforming technology of a base station is also considered, and beamforming may include any one of analog-domain beamforming, baseband-domain beamforming, or hybrid beamforming in an analog domain or a baseband domain. During downlink signal transmission, both beamforming on a transmit side of the base station and beamforming on a receive side of the terminal device may dynamically change. To track a beamforming change, the terminal device may obtain one or more optimal formed beams based on channel quality measurement of a plurality of reference signals on different formed beams.

In the prior art, when a signal is transmitted based on the beamforming technology, once a user moves, a direction of a formed beam corresponding to the transmitted signal may not match a moved user location. Consequently, a problem of frequent receive signal interruptions occurs. To track a formed-beam change in a signal transmission process, a result of channel quality measurement based on the beamforming technology needs to be reported. Channel quality measurement may be completed based on a synchronization signal or a cell-specific reference signal obtained after beamforming. The user performs handover between different formed beams more dynamically and frequently than handover between cells. Therefore, a dynamic measurement report mechanism is also required. Similar to a report of CSI information, a report of a channel quality measurement result of the formed beam may also be sent by the terminal device to the base station by using a physical uplink control channel or a physical uplink shared channel.

In a signal transmission process based on a formed beam, both optimal formed beams on a transmit side and a receive side need to be obtained by maximizing a signal beamforming gain and corresponding channel quality. According to a signal transmission method usually used in the prior art, a base station side and a terminal device side need to perform beam scanning and beam training on a formed transmit beam and a formed receive beam respectively, so as to complete selection of an optimal pair of a transmit beam and a receive beam.

In conclusion, in the prior art, the base station side and the terminal device side perform beam scanning and beam training on the formed transmit beam and the formed receive beam respectively. Consequently, time doubles for training optimal beams on the receive side and the transmit side, processing complexity is increased, and resource utilization efficiency is reduced.

SUMMARY

Embodiments of the present invention provide a signal transmission method, a network device, and a terminal device, so as to implement fast beam calibration for the network device and the terminal device, thereby simplifying a beam management process of the network device or the terminal device, and maximizing resource utilization efficiency.

To resolve the foregoing technical problem, the embodiments of the present invention provide the following technical solutions.

According to a first aspect, an embodiment of the present invention provides a signal transmission method, including: sending, by a network device, N first reference signals to a terminal device, where N is a positive integer greater than or equal to 1; sending, by the network device, physical layer control signaling to the terminal device, where the physical layer control signaling is used to trigger the terminal device to send a channel quality measurement result of the N first reference signals to the network device, the physical layer control signaling is further used to instruct the terminal device to send M second reference signals to the network device, and M is a positive integer greater than or equal to 1; receiving, by the network device, the channel quality measurement result sent by the terminal device; and receiving, by the network device, the M second reference signals sent by the terminal device. The physical layer control signaling is used to trigger the terminal device to send the channel quality measurement result of the N first reference signals to the network device, and the physical layer control signaling is further used to instruct the terminal device to send the M second reference signals to the network device. The terminal device may send the channel quality measurement result of the N first reference signals according to the physical layer control signaling, and the terminal device may further send the M second reference signals according to the physical layer control signaling. Therefore, in this embodiment of the present application, the network device and the terminal device do not need to perform beam scanning and beam training for a formed transmit beam and a formed receive beam respectively. The network device receives the channel quality measurement result of the N first reference signals and receives the M second reference signals, so that only the network device needs to perform beam calibration, so as to implement fast beam calibration for the network device and the terminal device, thereby simplifying a beam management process of the terminal device, and maximizing resource utilization efficiency.

In a possible design, the channel quality measurement result includes a resource index of one of the N first reference signals. The terminal device receives the N first reference signals sent by the network device, and the terminal device may select a resource index of one of the N first reference signals, and then send the selected resource index of the first reference signal to the network device, so that the network device may determine a preferable transmit beam of the network device based on an association relationship between the resource index reported by the terminal device and a formed beam, thereby providing reference for the network device to perform beam calibration.

In a possible design, transmission bandwidth of the second reference signal is less than or equal to transmission bandwidth of the first reference signal; and/or a frequency domain resource used for transmitting the second reference signal is a subset of a frequency domain resource used for transmitting the first reference signal. The first reference signal is sent by the network device, and the second reference signal is sent by the terminal device. Generally, a signal processing capability of the network device is greater than a signal processing capability of the terminal device, and the terminal device has limited power. The transmission bandwidth of the second reference signal sent by the terminal device is less than or equal to the transmission bandwidth of the first reference signal sent by the network device, so as to ensure that signal transmit power of the terminal device on unit frequency domain resource is large enough. In addition, a frequency domain resource used for transmitting the second reference signal by the terminal device is a subset of a frequency domain resource used for transmitting the first reference signal by the network device, so that the network device may calibrate, within a same frequency domain resource range as the second reference signal sent by the terminal device, a transmit beam corresponding to the first reference signal and a receive beam corresponding to the second reference signal.

In a possible design, the receiving, by the network device, the M second reference signals sent by the terminal device includes: receiving, by the network device, the M second reference signals repeatedly sent by the terminal device in a time division mode. The terminal device repeatedly sends the second reference signal, and sends the M second reference signals in total. The network device may receive the second reference signal in a time division mode. The network device repeatedly receives, based on a specific receive interval, the second reference signal sent by the terminal device, and receives the M second reference signals in total sent by the terminal device.

According to a second aspect, an embodiment of the present application further provides a signal transmission method, including: receiving, by a terminal device, N first reference signals sent by a network device, where N is a positive integer greater than or equal to 1; obtaining, by the terminal device, a channel quality measurement result of the N first reference signals; receiving, by the terminal device, physical layer control signaling sent by the network device, where the physical layer control signaling is used to trigger the terminal device to send the channel quality measurement result of the N first reference signals to the network device, the physical layer control signaling is further used to instruct the terminal device to send M second reference signals to the network device, and M is a positive integer greater than or equal to 1; sending, by the terminal device, the channel quality measurement result to the network device; and sending, by the terminal device, the M second reference signals to the network device. The physical layer control signaling is used to trigger the terminal device to send the channel quality measurement result of the N first reference signals to the network device, and the physical layer control signaling is further used to instruct the terminal device to send the M second reference signals to the network device. The terminal device may send the channel quality measurement result of the N first reference signals according to the physical layer control signaling, and the terminal device may further send the M second reference signals according to the physical layer control signaling. Therefore, in this embodiment of the present application, the network device and the terminal device do not need to perform beam scanning and beam training for a formed transmit beam and a formed receive beam respectively. The network device receives the channel quality measurement result of the N first reference signals and receives the M second reference signals, so that only the network device needs to perform beam calibration, so as to implement fast beam calibration for the network device and the terminal device, thereby simplifying a beam management process of the terminal device, and maximizing resource utilization efficiency.

In a possible design, transmission bandwidth of the second reference signal is less than or equal to transmission bandwidth of the first reference signal; and/or a frequency domain resource used for transmitting the second reference signal is a subset of a frequency domain resource used for transmitting the first reference signal. The first reference signal is sent by the network device, and the second reference signal is sent by the terminal device. Generally, a signal processing capability of the network device is greater than a signal processing capability of the terminal device. Therefore, by configuration, transmission bandwidth of the second reference signal is less than or equal to transmission bandwidth of the first reference signal, and a frequency domain resource used for transmitting the second reference signal is a subset of a frequency domain resource used for transmitting the first reference signal.

In a possible design, the sending, by the terminal device, the M second reference signals to the network device includes: repeatedly sending, by the terminal device, the M second reference signals to the network device in a time division mode. The terminal device repeatedly sends the second reference signal, and sends the M second reference signals in total, so that the network device can receive the M second reference signals.

According to a third aspect, an embodiment of the present application further provides a signal transmission method, including: sending, by a terminal device, N first reference signals to a network device, where N is a positive integer greater than or equal to 1; receiving, by the terminal device, physical layer control signaling sent by the network device, where the physical layer control signaling is used to carry a channel quality measurement result of the N first reference signals that is sent by the network device to the terminal device; receiving, by the terminal device, the channel quality measurement result of the N first reference signals; and receiving, by the terminal device, M second reference signals sent by the network device, where sending the M second reference signals by the network device is also triggered by the physical layer control signaling, and M is a positive integer greater than or equal to 1. The physical layer control signaling is used to trigger the network device to send the channel quality measurement result of the N first reference signals to the terminal device, and the physical layer control signaling is further used to instruct the network device to send the M second reference signals to the terminal device. Therefore, the terminal device may perform beam calibration based on the channel quality measurement result of the N first reference signals that is sent according to the physical layer control signaling and based on a channel quality measurement result of the M second reference signals of the terminal device. Likewise, the network device may also perform corresponding beam calibration based on the foregoing information. Therefore, in this embodiment of the present application, fast beam calibration for the network device and the terminal device can be implemented, thereby simplifying a beam management process of the network device or the terminal device, and maximizing resource utilization efficiency.

In a possible design, the channel quality measurement result includes a resource index of one of the N first reference signals. The network device receives the N first reference signals sent by the terminal device, and the network device may select a resource index of one of the N first reference signals, and then send the selected resource index of the first reference signal to the terminal device, so that the terminal device can determine the resource index of the first reference signal selected by the network device.

In a possible design, after the receiving, by the terminal device, M second reference signals sent by the network device, the method further includes: receiving, by the terminal device, a beam calibration criterion configured by the network device and/or a calibration threshold corresponding to the beam calibration criterion; and performing, by the terminal device, beam calibration based on the received channel quality measurement result and a channel quality measurement result of the M second reference signals, by using the beam calibration criterion and/or the calibration threshold corresponding to the beam calibration criterion. After performing beam calibration, the terminal device may determine whether reciprocity between a receive beam and a transmit beam on a terminal device side stands.

In a possible design, the method further includes: reporting, by the terminal device to the network device, a result obtained after the terminal device performs beam calibration. After performing beam calibration, the terminal device may determine whether reciprocity between a receive beam and a transmit beam on a terminal device side stands, and report a calibration result of the reciprocity between a receive beam and a transmit beam to the network device.

In a possible design, transmission bandwidth of the second reference signal is greater than or equal to transmission bandwidth of the first reference signal; and/or a frequency domain resource used for transmitting the first reference signal is a subset of a frequency domain resource used for transmitting the second reference signal. The second reference signal is sent by the network device, and the first reference signal is sent by the terminal device. Generally, a signal processing capability of the network device is greater than a signal processing capability of the terminal device. Therefore, by configuration, transmission bandwidth of the second reference signal is greater than or equal to transmission bandwidth of the first reference signal, and a frequency domain resource used for transmitting the first reference signal is a subset of a frequency domain resource used for transmitting the second reference signal.

In a possible design, the receiving, by the terminal device, M second reference signals sent by the network device includes: receiving, by the terminal device, the M second reference signals repeatedly sent by the network device in a time division mode. The network device repeatedly sends the second reference signal, and sends the M second reference signals in total. The terminal device may receive the second reference signal in a time division mode. The terminal device repeatedly receives, based on a specific receive interval, the second reference signal sent by the terminal device, and receives the M second reference signals in total sent by the network device.

According to a fourth aspect, an embodiment of the present application further provides a signal transmission method, including: receiving, by a network device, N first reference signals sent by a terminal device, where N is a positive integer greater than or equal to 1; obtaining, by the network device, a channel quality measurement result of the N first reference signals; sending, by the network device, physical layer control signaling to the terminal device, where the physical layer control signaling is used to carry the channel quality measurement result of the N first reference signals that is sent by the network device to the terminal device; and sending, by the network device, M second reference signals to the terminal device, where sending the M second reference signals is also triggered by the physical layer control signaling, and M is a positive integer greater than or equal to 1. The physical layer control signaling is used to trigger the network device to send the channel quality measurement result of the N first reference signals to the terminal device, and the physical layer control signaling is further used to instruct the network device to send the M second reference signals to the terminal device. Therefore, the terminal device may perform beam calibration based on the channel quality measurement result of the N first reference signals that is sent according to the physical layer control signaling and based on a channel quality measurement result of the M second reference signals of the terminal device. Likewise, the network device may also perform corresponding beam calibration based on the foregoing information. Therefore, in this embodiment of the present application, fast beam calibration for the network device and the terminal device can be implemented, thereby simplifying a beam management process of the network device or the terminal device.

In a possible design, after the sending, by the network device, M second reference signals to the terminal device, the method further includes: receiving, by the network device, a result that is reported by the terminal device and that is obtained after the terminal device performs beam calibration. After performing beam calibration, the terminal device may determine whether reciprocity between a receive beam and a transmit beam on a terminal device side stands, and report a calibration result of the reciprocity between a receive beam and a transmit beam to a base station.

In a possible design, transmission bandwidth of the second reference signal is greater than or equal to transmission bandwidth of the first reference signal; and/or a frequency domain resource used for transmitting the first reference signal is a subset of a frequency domain resource used for transmitting the second reference signal. The second reference signal is sent by the network device, and the first reference signal is sent by the terminal device. Generally, a signal processing capability of the network device is greater than a signal processing capability of the terminal device. Therefore, by configuration, transmission bandwidth of the second reference signal is greater than or equal to transmission bandwidth of the first reference signal, and a frequency domain resource used for transmitting the first reference signal is a subset of a frequency domain resource used for transmitting the second reference signal.

In a possible design, the sending, by the network device, M second reference signals to the terminal device includes: repeatedly sending, by the network device, the M second reference signals to the terminal device in a time division mode. The network device repeatedly sends the second reference signal, and sends the M second reference signals in total, so that the terminal device can receive the M second reference signals.

In the foregoing method embodiments, a moment n for sending the M second reference signals and a moment k for sending the channel quality measurement result meet the following condition: n=k+m, where m is a positive integer greater than 0, or m is equal to 0, or m is a negative integer less than 0. The moment k for sending the channel quality measurement result triggered by the physical layer control signaling and the moment n for sending the M second reference signals may be the same or may be different, and values of n and k may be determined based on a specific scenario. Further, a value of m is predefined; or a value of m is indicated to the terminal device by using higher layer signaling or the physical layer control signaling. Both the network device and the terminal device may predefine the value of m, or the network device may indicate the value of m to the terminal device by using the higher layer signaling or the physical layer control signaling.

According to a fifth aspect, an embodiment of the present application provides a network device, and the network device has functions of implementing operations of the network device in the foregoing method design. The functions may be implemented by hardware, or may be implemented by hardware executing corresponding software. The hardware or software includes one or more modules corresponding to the foregoing functions.

In a possible design, a structure of the network device includes a receiver and a transmitter. The transmitter and the receiver are configured to: support the network device in communicating with the terminal device; and send information or an instruction related to the foregoing method to the terminal device, or receive information or an instruction related to the foregoing method from the terminal device. The network device may further include a memory and a processor, configured to: support the network device in executing a corresponding function in the foregoing method; and store a necessary program and instruction of the network device.

According to a sixth aspect, an embodiment of the present application further provides a terminal device, and the terminal device has functions of implementing operations of the terminal device in the foregoing method design. The functions may be implemented by hardware, or may be implemented by hardware executing corresponding software. The hardware or software includes one or more modules corresponding to the foregoing functions. The module may be software and/or hardware.

In a possible design, a structure of the terminal device includes a receiver, a processor, and a transmitter. The transmitter and the receiver are configured to: support the terminal device in communicating with a network device; and send information or an instruction related to the foregoing method to the network device, or receive information or an instruction related to the foregoing method from the network device. The processor is configured to support the terminal device in executing a corresponding function in the foregoing method. The terminal device may further include a memory, configured to store a necessary program and instruction of the network device.

According to a seventh aspect, an embodiment of the present application further provides a network device, and the network device has functions of implementing operations of the network device in the foregoing method design. The functions may be implemented by hardware, or may be implemented by hardware executing corresponding software. The hardware or software includes one or more modules corresponding to the foregoing functions.

In a possible design, a structure of the network device includes a receiver and a transmitter. The transmitter and the receiver are configured to: support the network device in communicating with the terminal device; and send information or an instruction related to the foregoing method to the terminal device, or receive information or an instruction related to the foregoing method from the terminal device. The network device may further include a memory and a processor, configured to: support the network device in executing a corresponding function in the foregoing method; and store a necessary program and instruction of the network device.

According to an eighth aspect, an embodiment of the present application further provides a terminal device, and the terminal device has functions of implementing operations of the terminal device in the foregoing method design. The functions may be implemented by hardware, or may be implemented by hardware executing corresponding software. The hardware or software includes one or more modules corresponding to the foregoing functions. The module may be software and/or hardware.

In a possible design, a structure of the terminal device includes a receiver, a processor, and a transmitter. The transmitter and the receiver are configured to: support the terminal device in communicating with a network device; and send information or an instruction related to the foregoing method to the network device, or receive information or an instruction related to the foregoing method from the network device. The processor is configured to support the network device in executing a corresponding function in the foregoing method. The network device may further include a memory, configured to store a necessary program and instruction of the network device.

In the embodiments of the present application, the network device and the terminal device do not need to perform beam scanning and beam training for a formed transmit beam and a formed receive beam respectively. The network device receives the channel quality measurement result of the N first reference signals and receives the M second reference signals, so that only the network device needs to perform beam calibration, so as to implement fast beam calibration for the network device and the terminal device, thereby simplifying the beam management process of the terminal device, and maximizing the resource utilization efficiency.

DESCRIPTION OF EMBODIMENTS

The embodiments of the present application provide a signal transmission method, a network device, and a terminal device, so as to implement fast beam calibration for the network device and the terminal device, thereby simplifying a beam management process of the network device or the terminal device, and maximizing resource utilization efficiency.

The following describes the embodiments of the present application with reference to accompanying drawings.

In the specification, claims, and accompanying drawings of the present application, the terms "first", "second", and the like are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of the present application. Moreover, the terms "include", "contain" and any other variants mean to cover the non-exclusive inclusion, for example, a process, method, system, product, or device that includes a list of units is not necessarily limited to those units, but may include other units not expressly listed or inherent to such a process, method, system, product, or device.

Figure 1:
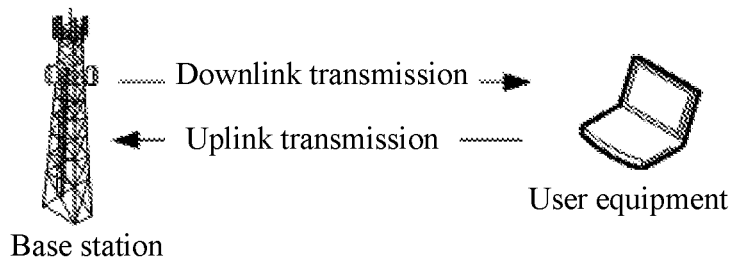
FIG. 1 is a schematic diagram of a system architecture to which a signal transmission method according to an embodiment of the present application is applied.

A system architecture to which the signal transmission method provided in the embodiments of the present application is applied is first described. The embodiments of the present application are applicable to a 5G communications system, a 4G communications system, or the like. For example, the embodiments of the present application are applicable to a Long Term Evolution (long term evolution, LTE) system or a Wideband Code Division Multiple Access (wideband code division multiple access, WCDMA) system. FIG. 1 is a schematic diagram of a system architecture to which a signal transmission method according to an embodiment of the present application is applied. The system may include a network device and a terminal device. The network device may be specifically a base station, and the terminal device may be specifically a mobile phone, a notebook computer, a tablet computer, or the like. Based on the system architecture provided in this embodiment of the present application, the base station may perform downlink transmission to the terminal device. For example, the base station sends a synchronization signal sequence to the terminal device. The terminal device may perform uplink transmission to the base station. Transmission herein may be specifically data transmission and physical layer control signaling transmission.

Figure 2:
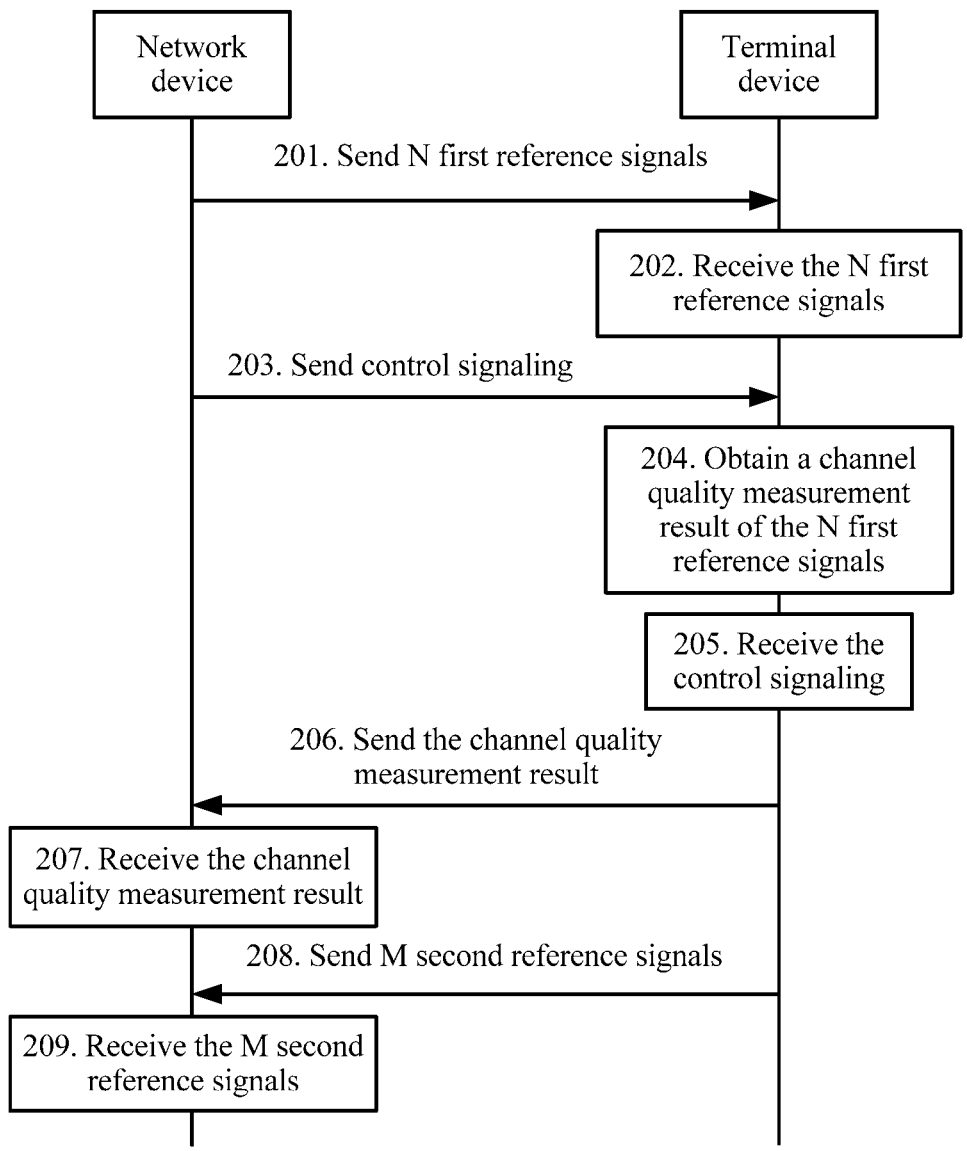
FIG. 2 is a schematic block flowchart of a signal transmission method according to an embodiment of the present application.

In some embodiments of the present application, a process of interaction between a network device and a terminal device is first described. Referring to FIG. 2, a signal transmission method provided in an embodiment of the present application may include the following steps.

201. A network device sends N first reference signals to a terminal device, where N is a positive integer greater than or equal to 1.

The N first reference signals sent by the network device are N downlink reference signals, and a value of N is a positive integer greater than or equal to 1. The N downlink reference signals may be N downlink reference signals that are periodically sent, or may be N downlink reference signals that are semi-statically sent, or may be N downlink reference signals that are dynamically and aperiodically sent. This is not limited herein.

202. The terminal device receives the N first reference signals sent by the network device, where N is a positive integer greater than or equal to 1.

In this embodiment of the present application, the network device may establish a network connection, for example, a wireless network connection, to the terminal device. The terminal device receives the N first reference signals sent by the network device. The N first reference signals are the N downlink reference signals sent by the network device. The terminal device may periodically receive the N downlink reference signals, or may receive the N downlink reference signals that are semi-statically triggered by the network device, or may receive N aperiodic reference signals that are dynamically triggered by the network device. This is not limited herein.

203. The network device sends physical layer control signaling to the terminal device, where the physical layer control signaling is used to trigger the terminal device to send a channel quality measurement result of the N first reference signals to the network device, the physical layer control signaling is further used to instruct the terminal device to send M second reference signals to the network device, and M is a positive integer greater than or equal to 1.

There is no sequence between step 203 and step 202. Before or after the network device sends the N first reference signals to the terminal device, the network device may send the physical layer control signaling to the terminal device. The physical layer control signaling generated by the network device may be used to trigger the terminal device to send the channel quality measurement result of the N first reference signals to the network device. In addition, the physical layer control signaling is further used to instruct the terminal device to send the M second reference signals to the network device. The physical layer control signaling sent by the network device may be specifically downlink physical layer control signaling. The M second reference signals sent by the terminal device are M uplink reference signals. The physical layer control signaling may be used to trigger sending an uplink reference signal for a plurality of times. The uplink reference signal may be continuously sent for a plurality of times, or may be not continuously sent for a plurality of times. This is not limited herein.

In some embodiments of the present application, transmission bandwidth of the second reference signal is less than or equal to transmission bandwidth of the first reference signal; and/or a frequency domain resource used for transmitting the second reference signal is a subset of a frequency domain resource used for transmitting the first reference signal.

The first reference signal is sent by the network device, and the second reference signal is sent by the terminal device. Generally, a signal processing capability of the network device is greater than a signal processing capability of the terminal device. Therefore, transmission bandwidth of the second reference signal is less than or equal to transmission bandwidth of the first reference signal, and a frequency domain resource used for transmitting the second reference signal is a subset of a frequency domain resource used for transmitting the first reference signal.

204. The terminal device obtains the channel quality measurement result of the N first reference signals.

There is no sequence between step 204 and step 203. The terminal device receives the N first reference signals sent by the network device. The terminal device may perform channel quality measurement on the N first reference signals sent by the network device, and generate the channel quality measurement result of the N first reference signals.

In some embodiments of the present application, the channel quality measurement result obtained by the terminal device may include a resource index of one of the N first reference signals. For example, the terminal device performs channel quality measurement on the N first reference signals corresponding to N formed beams, selects K (N≥K≥1) optimal first reference signals, and reports resource indexes of the K optimal first reference signals and corresponding beam channel quality information. The beam channel quality information may include at least one of a rank indication (rank indication, RI), channel quality information (channel quality information, CQI), reference signal received power (reference signal received power, RSRP), and reference signal received quality (reference signal received quality, RSRQ).

Further, the terminal device may select one first reference signal based on channel quality measurement of the N first reference signals, for example, may select a reference signal with best quality in a plurality of first reference signals; and report a resource index of the first reference signal selected by the terminal device and channel quality information corresponding to the resource index of the first reference signal. For example, reporting the resource index and the corresponding channel quality information may be dynamically triggered by physical layer control signaling.

For example, the resource index of the selected first reference signal may correspond to a transmit beam of the network device. The physical layer control signaling used to trigger reporting the resource index of the selected first reference signal and/or the channel quality information corresponding to the index is also used to trigger sending the M (M≥1) uplink reference signals, and the M uplink reference signals are sent to scan and select an optimal receive beam of the network device. In some embodiments of the present application, the M uplink reference signals may be M uplink reference signals repeatedly sent in a time division mode. The physical layer control signaling may be used to trigger sending an uplink reference signal for a plurality of times. The uplink reference signal may be continuously sent for a plurality of times, or may be not continuously sent for a plurality of times. This is not limited herein.

205. The terminal device receives the physical layer control signaling sent by the network device.

The physical layer control signaling is used to trigger the terminal device to send the channel quality measurement result of the N first reference signals to the network device, and the physical layer control signaling is further used to instruct the terminal device to send the M second reference signals to the network device, where M is a positive integer greater than or equal to 1.

In some embodiments of the present application, after step 203 in which the network device sends physical layer control signaling to the terminal device, the terminal device parses the physical layer control signaling; determines, from the physical layer control signaling, that the terminal device is to send the channel quality measurement result of the N first reference signals to the network device; and determines, from the physical layer control signaling, that the terminal device is to send the M second reference signals to the network device.

206. The terminal device sends the channel quality measurement result to the network device.

The terminal device sends the channel quality measurement result to the network device according to a trigger of the physical layer control signaling.

207. The network device receives the channel quality measurement result sent by the terminal device.

The terminal device sends the channel quality measurement result of the N first reference signals, and the network device receives the channel quality measurement result sent by the terminal device. For example, the network device determines, by using the channel quality measurement result, one first reference signal selected by the terminal device from the N first reference signals.

208. The terminal device sends the M second reference signals to the network device.

The terminal device sends the M second reference signals to the network device according to an instruction of the physical layer control signaling. The M second reference signals sent by the terminal device are M uplink reference signals. The physical layer control signaling may be used to trigger sending an uplink reference signal for a plurality of times. The uplink reference signal may be continuously sent for a plurality of times, or may be not continuously sent for a plurality of times. This is not limited herein.

In some embodiments of the present application, step 208 in which the terminal device sends the M second reference signals to the network device includes:

repeatedly sending, by the terminal device, the M second reference signals to the network device in a time division mode. The terminal device may send the second reference signal in a time division mode. To be specific, the terminal device repeatedly sends the second reference signal to the network device based on a transmit interval, and sends the M second reference signals in total to the network device.

In some embodiments of the present application, a moment n for sending the M second reference signals and a moment k for sending the channel quality measurement result meet the following condition:

n=k+m, where m is a positive integer greater than 0, or m is equal to 0.

For example, the moment k for sending the channel quality measurement result according to a trigger of the physical layer control signaling and the moment n for sending the M (M≥1) uplink reference signals may be the same or may be different. For example, the moment n for sending the M uplink reference signals and the moment k for sending the channel quality measurement result meet the following condition: n=k+m, where m is a positive integer greater than 0, or m is equal to 0. In actual application, a value of m cannot be arbitrarily large. Otherwise, beam calibration accuracy is affected. A formed transmit beam for the M uplink reference signals is the same as a formed receive beam obtained through measurement, so as to ensure calibration accuracy of an optimal receive beam and an optimal transmit beam on a network device side.

In other embodiments of the present application, a value of m may be an integer less than 0. To be specific, the moment for sending the M second reference signals is a moment before the moment for sending the channel quality measurement result of the N first reference signals. No specific limitation is imposed herein.

In some embodiments of the present application, a value of m is predefined; or a value of m is indicated to the terminal device by using higher layer signaling or the physical layer control signaling. Both the network device and the terminal device may predefine the value of m, or the network device may indicate the value of m to the terminal device by using the higher layer signaling or the physical layer control signaling. The higher layer signaling may be specifically Radio Resource Control (radio resource control, RRC) signaling, another higher layer signaling, or the like. The present application imposes no specific limitation thereto.

209. The network device receives the M second reference signals sent by the terminal device.

For example, the terminal device sends the M second reference signals, and the network device receives the M second reference signals sent by the terminal device. For example, the network device may receive the M second reference signals that are periodically sent by the terminal device, or may receive the M second reference signals that are semi-statically sent by the terminal device, or may receive the M second reference signals that are dynamically and aperiodically sent by the terminal device. This is not limited herein.

In some embodiments of the present application, step 209 in which the network device receives the M second reference signals sent by the terminal device includes:

receiving, by the network device, the M second reference signals repeatedly sent by the terminal device in a time division mode. Specifically, the terminal device repeatedly sends the second reference signal, and sends the M second reference signals in total. The network device may receive the second reference signal in a time division mode. The network device repeatedly receives, based on a specific receive interval, the second reference signal sent by the terminal device, and receives the M second reference signals in total sent by the terminal device.

In some embodiments of the present application, the network device performs beam calibration based on the received a channel quality measurement result of the N first reference signals and a channel quality measurement result of the M second reference signals. When reciprocity exists between a formed beam on a transmit side and a formed beam on a receive side, an optimal formed beam on the transmit side is the same as an optimal formed beam on the receive side. Therefore, an optimal formed beam on one side can be selected by performing optimal formed beam training and selection on the other side only. Measure indicators used to determine whether beam reciprocity stands may include at least one of a signal-to-noise ratio, received signal power corresponding to a beam, received signal quality corresponding to a beam, channel state information (such as CQI) corresponding to a beam, a beam index, or a reference signal index. An optimal receive beam may be measured and selected based on a value of at least one of the measure indicators, so as to determine whether the beam reciprocity stands. The received signal power corresponding to a beam may be specifically reference signal received power (reference signal received power, RSRP for short), and the received signal quality corresponding to a beam may be reference signal received quality (reference signal received quality, RSRQ for short), or the like. In addition, the channel state information corresponding to a beam may be CSI information in LTE, for example, at least one of a channel state information-reference signal index (CSI-RS Index, CRI for short), the rank indication (Rank Indication, RI for short), a precoding matrix indication (Precoding Matrix Indicator, PMI for short), or CQI. Alternatively, the channel state information corresponding to a beam may be channel quality information of radio resource management (radio resource management, RRM for short) measurement, for example, at least one of RSRP and RSRQ. This embodiment of the present application imposes no limitation thereto.

Figure 3:
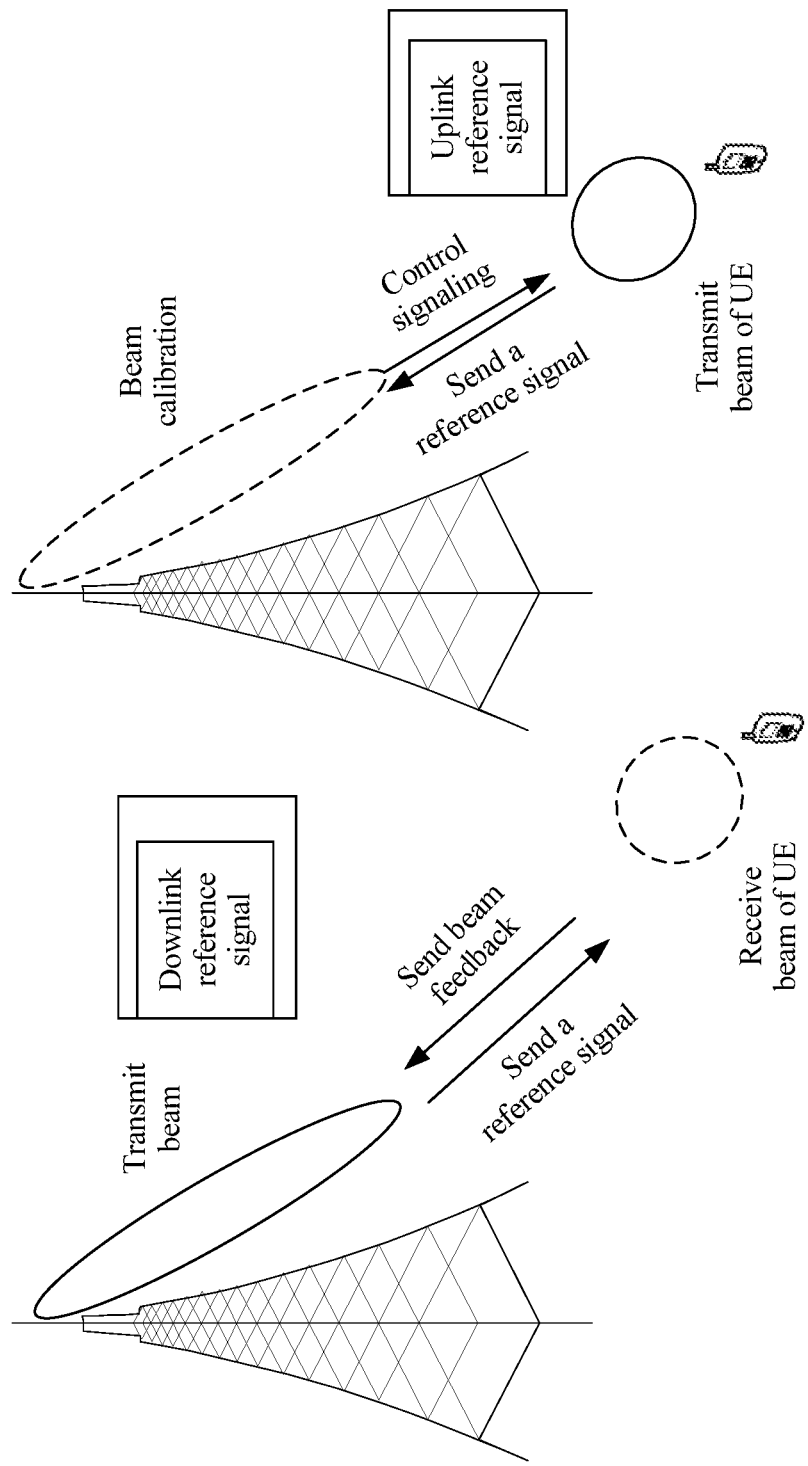
FIG. 3 is a schematic diagram of a scenario in which a network device completes beam calibration according to an embodiment of the present application.

FIG. 3 is a schematic diagram of a scenario in which a network device completes beam calibration according to an embodiment of the present application. An example in which a network device is a base station and a terminal device is UE is used for description. A base station side completes calibration of reciprocity between a receive beam and a transmit beam. The base station sends N downlink reference signals to the UE by using N different transmit beams, and the UE receives the N downlink reference signals by using N same or different receive beams. The UE performs channel quality measurement on the N downlink reference signals, and sends a channel quality measurement result corresponding to a beam to the base station. For example, the channel quality measurement result sent by the UE may include a resource index of one of the N downlink reference signals. The base station sends physical layer control signaling to the UE, and the UE sends M uplink reference signals to the base station according to trigger information of the physical layer control signaling. The base station performs channel quality measurement on the M uplink reference signals, and performs beam calibration based on the received channel quality measurement result of the N downlink reference signals and a channel quality measurement result of the M uplink reference signals.

In some embodiments of the present application, a moment k for sending the channel quality measurement result according to a trigger of the physical layer control signaling and a moment n for sending the M (M≥1) uplink reference signals may be the same or may be different. For example, the moment n for sending the M uplink reference signals and the moment k for sending the channel quality measurement result meet the following condition: n=k 30 m, where m is a positive integer greater than 0, or m is equal to 0. In actual application, a value of m cannot be arbitrarily large. Otherwise, beam calibration accuracy is affected. A formed transmit beam for the M uplink reference signals is the same as a formed receive beam used for receiving the downlink reference signal and obtaining the channel quality measurement result, so as to ensure calibration accuracy of an optimal receive beam and an optimal transmit beam on a network device side.

Further, optionally, a value of m may be an integer less than 0. To be specific, the moment for sending the M uplink reference signals is a moment before the moment for sending the channel quality measurement result of the N downlink reference signals. No specific limitation is imposed herein.

Referring to the following Table 1, an example in which a reference signal is specifically a sounding reference signal (sounding reference signal, SRS) is used to describe an information bit value of the physical layer control signaling used to trigger sending an uplink reference signal and sending a channel quality measurement result.

| SRS request domain value | Description |
| --- | --- |
| '00' | Skip triggering an SRS and sending a channel quality measurement result |
| '01' | Trigger sending an SRS corresponding to a first SRS parameter set configured by using higher layer signaling, and simultaneously trigger sending a channel quality measurement result |
| '10' | Trigger sending an SRS corresponding to a second SRS parameter set configured by using higher layer signaling, and simultaneously trigger sending a channel quality measurement result |
| '11' | Trigger sending an SRS corresponding to a third SRS parameter set configured by using higher layer signaling, and simultaneously trigger sending a channel quality measurement result |

In some embodiments of the present application, the base station may use separate signaling to trigger sending the channel quality measurement result of the N downlink reference signals and sending the M (M≥1) uplink reference signals. Likewise, in this case, a formed transmit beam for the M uplink reference signal is the same as a formed receive beam used for receiving the downlink reference signals and obtaining a channel quality measurement result. To ensure this, the base station needs to simultaneously indicate an association or a correspondence between sending the M uplink reference signals and reporting the channel quality measurement result of the N downlink reference signals, for example, an association between the foregoing sending moment and the foregoing reporting moment, to be specific, an association or a correspondence between the moment for sending the M uplink reference signals and a moment for reporting the channel quality measurement result of the N downlink reference signals.

By using the foregoing example, it can be learned that, after the network device sends the N first reference signals to the terminal device, the network device may further send the physical layer control signaling to the terminal device. The physical layer control signaling is used to trigger the terminal device to send the channel quality measurement result of the N first reference signals to the network device, and the physical layer control signaling is further used to instruct the terminal device to send the M second reference signals to the network device, so that the terminal device may send the channel quality measurement result of the N first reference signals according to the physical layer control signaling, and the terminal device may further send the M second reference signals according to the physical layer control signaling. Therefore, in this embodiment of the present application, the network device and the terminal device do not need to perform beam scanning and beam training for a formed transmit beam and a formed receive beam respectively. The network device receives the channel quality measurement result of the N first reference signals and receives the M second reference signals, so that only the network device needs to perform beam calibration, so as to implement fast beam calibration for the network device and the terminal device, thereby simplifying a beam management process of the terminal device, and maximizing resource utilization efficiency.

Figure 4:
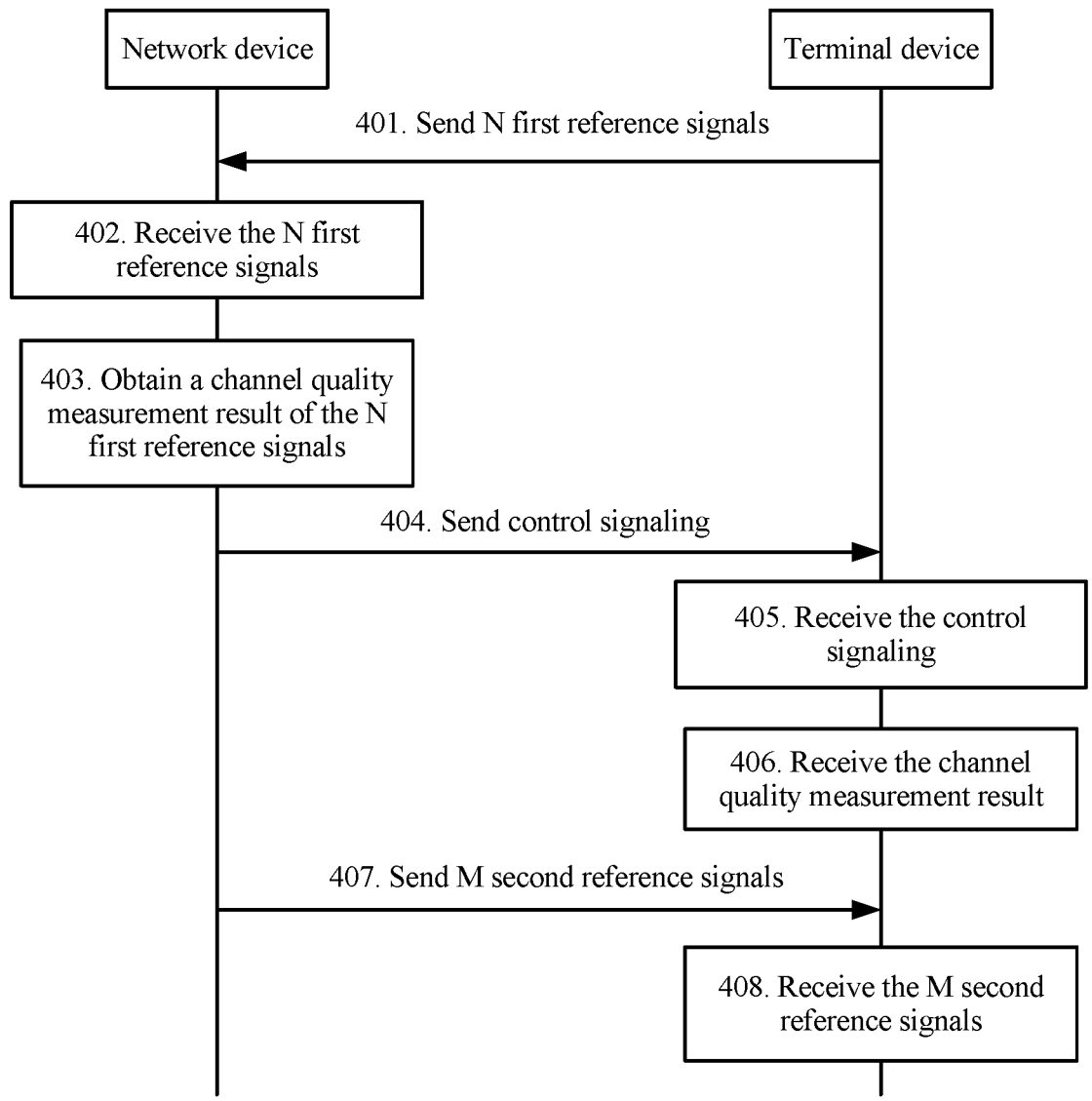
FIG. 4 is a schematic block flowchart of another signal transmission method according to an embodiment of the present application.

The foregoing embodiment describes calibration of reciprocity between a receive beam and a transmit beam on a network device side. The following uses an example in which calibration of reciprocity between a receive beam and a transmit beam is completed on a terminal device side for description. A process of interaction between a network device and a terminal device is described. Referring to FIG. 4, a signal transmission method provided in an embodiment of the present application may include the following steps.

401. A terminal device sends N first reference signals to a network device, where N is a positive integer greater than or equal to 1.

The N first reference signals sent by the terminal device are N uplink reference signals, and a value of N is a positive integer. The N uplink reference signals may be N uplink reference signals that are periodically sent, or may be N uplink reference signals that are semi-statically sent, or may be N uplink reference signals that are dynamically triggered by the network device. This is not limited herein.

402. The network device receives the N first reference signals sent by the terminal device, where N is a positive integer greater than or equal to 1.

In this embodiment of the present application, the network device may establish a network connection, for example, a wireless network connection, to the terminal device. The network device receives the N first reference signals sent by the terminal device.

403. The network device obtains a channel quality measurement result of the N first reference signals.

The network device receives the N first reference signals sent by the terminal device. The network device may perform channel quality measurement on the N first reference signals sent by the terminal device, and generate the channel quality measurement result of the N first reference signals.

In some embodiments of the present application, the channel quality measurement result includes a resource index of one of the N first reference signals.

404. The network device sends physical layer control signaling to the terminal device, where the physical layer control signaling is used to carry the channel quality measurement result of the N first reference signals that is sent by the network device to the terminal device, and N is a positive integer greater than or equal to 1.

Before or after the network device obtains the channel quality measurement result of the N first reference signals, the network device may send the physical layer control signaling to the terminal device. The physical layer control signaling generated by the network device may be used to carry the channel quality measurement result of the N first reference signals. In addition, the physical layer control signaling is further used to instruct the network device to send M second reference signals to the terminal device.

405. The terminal device receives the physical layer control signaling sent by the network device, where the physical layer control signaling is used to carry the channel quality measurement result of the N first reference signals that is sent by the network device to the terminal device, and N is a positive integer greater than or equal to 1.

For example, after the network device sends the physical layer control signaling to the terminal device, the terminal device receives the physical layer control signaling sent by the network device; parses the physical layer control signaling; determines, from the physical layer control signaling, that the network device is to send the channel quality measurement result of the N first reference signals; and determines, from the physical layer control signaling, that the network device is to send the M second reference signals to the terminal device.

406. The terminal device receives the channel quality measurement result of the N first reference signals.

The terminal device receives the channel quality measurement result of the N first reference signals according to the physical layer control signaling sent by the network device.

407. The network device sends M second reference signals to the terminal device, where sending the M second reference signals by the network device is also triggered by the physical layer control signaling, and M is a positive integer greater than or equal to 1.

The physical layer control signaling sent by the network device to the terminal device may also be used to trigger the network device to send the channel quality measurement result of the N first reference signals to the terminal device.

In some embodiments of the present application, transmission bandwidth of the second reference signal is greater than or equal to transmission bandwidth of the first reference signal; and/or a frequency domain resource used for transmitting the first reference signal is a subset of a frequency domain resource used for transmitting the second reference signal.

In some embodiments of the present application, step 407 in which the network device sends M second reference signals to the terminal device includes:

repeatedly sending, by the network device, the M second reference signals to the terminal device in a time division mode.

In some embodiments of the present application, a moment n for sending the M second reference signals and a moment k for sending the channel quality measurement result meet the following condition:

n=k+m, where m is a positive integer greater than 0, or m is equal to 0.

Further, a value of m is predefined; or a value of m is indicated to the terminal device by using the physical layer control signaling or higher layer signaling.

Further, optionally, a value of m may be an integer less than 0. To be specific, the moment for sending the M second reference signals is a moment before the moment for sending the channel quality measurement result.

408. The terminal device receives the M second reference signals sent by the network device, where sending the M second reference signals by the network device is also triggered by the physical layer control signaling.

For example, the network device sends the M second reference signals to the terminal device, and the terminal device receives the M second reference signals sent by the network device. For example, the terminal device may periodically receive the M second reference signals, or may receive the M second reference signals that are semi-statically sent by the network device, or may receive the M second reference signals that are dynamically sent by the network device. This is not limited herein.

In some embodiments of the present application, step 408 in which the terminal device receives the M second reference signals sent by the network device includes:

receiving, by the terminal device, the M second reference signals repeatedly sent by the network device in a time division mode.

In some embodiments of the present application, the signal transmission method provided in this embodiment of the present application further includes:

receiving, by the terminal device, a beam calibration criterion configured by the network device and/or a calibration threshold corresponding to the beam calibration criterion; and performing, by the terminal device, beam calibration based on the received channel quality measurement result and a channel quality measurement result of the M second reference signals, by using the beam calibration criterion and/or the calibration threshold corresponding to the beam calibration criterion.

Further, the signal transmission method provided in this embodiment of the present application further includes:

reporting, by the terminal device, a beam calibration result of the terminal device to the network device.

In some embodiments of the present application, after step 407 in which the network device sends M second reference signals to the terminal device, the signal transmission method provided in this embodiment of the present application further includes:

receiving, by the network device, the beam calibration result of the terminal device reported by the terminal device.

After the terminal device completes beam calibration, the network device may receive the beam calibration result of the terminal device by using the terminal device.

Figure 5:
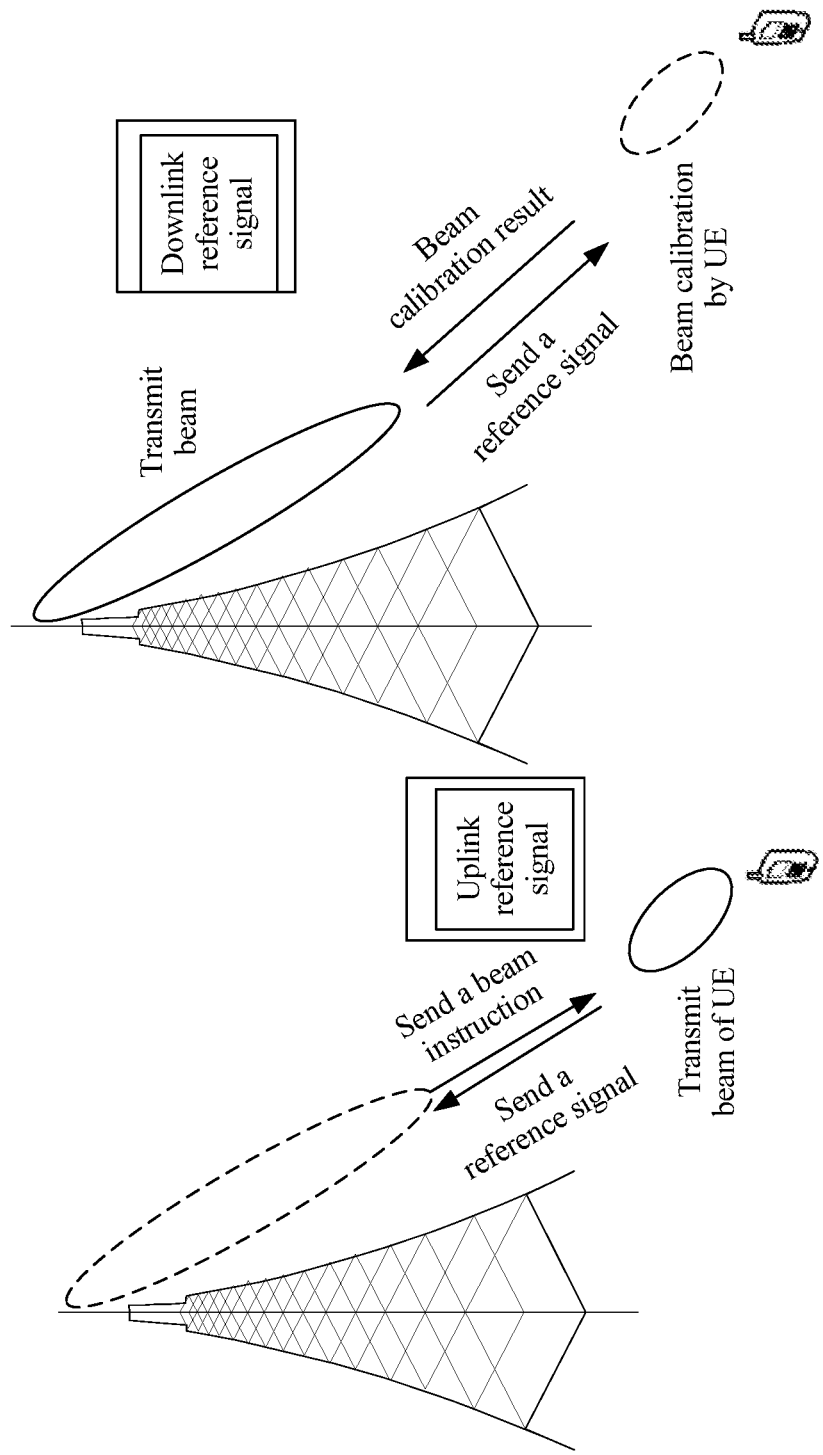
FIG. 5 is a schematic diagram of a scenario in which a terminal device completes beam calibration according to an embodiment of the present application.

FIG. 5 is a schematic diagram of a scenario in which a terminal device completes beam calibration according to an embodiment of the present application. An example in which a network device is a base station and a terminal device is UE is used for description. A UE side completes calibration of reciprocity between a receive beam and a transmit beam. The UE sends N uplink reference signals to the base station by using N different transmit beams. The base station receives the N uplink reference signals by using N same or different receive beams; performs channel quality measurement on the N uplink reference signals; and sends a channel quality measurement result indication to the UE. For example, physical layer control signaling sent by the base station carries a channel quality measurement result of the N uplink reference signals. Specifically, the channel quality measurement result may include a resource index of one of the N uplink reference signals. The physical layer control signaling may be any one of a physical-layer downlink control signaling format 0, 1, 2, 2A, 2B, 2C, or 2D of an LTE system. The base station sends M downlink reference signals to the UE. The UE performs channel quality measurement on the M downlink reference signals; performs beam calibration based on the received channel quality measurement result of the N uplink reference signals and a channel quality measurement result of the M downlink reference signals of the UE; and reports a beam calibration result to the base station. Specifically, the beam calibration result may be indication information used to indicate whether beam reciprocity stands, or may be a quantized value that meets a beam calibration criterion. This is not limited herein.

An embodiment of the present application provides a beam calibration method and mechanism of a base station and a UE side, so as to implement fast and accurate beam calibration at a base station end and a UE end by using the mechanism, thereby simplifying a beam management process of the base station or UE, reducing beam scanning, and maximizing resource utilization efficiency. In this embodiment of the present application, calibration of reciprocity between a receive beam and a transmit beam on a UE side is described by using an example.

The base station may use separate signaling to trigger indication or notification of a channel quality measurement result of N uplink reference signals, and trigger sending M (M≥1) downlink reference signals. In this case, a formed transmit beam of the base station for the M (M≥1) downlink reference signals is the same as a formed receive beam of the base station obtained through measurement based on the channel quality measurement result of the N uplink reference signals. To ensure this, the base station needs to simultaneously indicate an association or a correspondence between sending the M downlink reference signals and the channel quality measurement result of the N uplink reference signals, for example, an association relationship between the foregoing sending moment and the foregoing reporting moment, to be specific, an association or a correspondence between a moment for sending the M downlink reference signals and a moment for indicating or notifying the channel quality measurement result of the N uplink reference signals.

The UE obtains an optimal receive beam based on measurement of the M downlink reference signals, and may determine, by calibrating a difference between the optimal receive beam and an optimal uplink transmit beam notified by the base station, whether reciprocity between a receive beam and a transmit beam on a user side stands. In addition, the UE reports information about or a result of calibration of the reciprocity between a receive beam and a transmit beam to the base station. The information about or the result of the calibration of the reciprocity between a receive beam and a transmit beam may be specifically a 1-bit indication message. The indication message includes "yes" or "no"; or may be information about a quantized difference between a receive beam and a transmit beam. This is not limited herein.

In some embodiments of the present application, the base station may configure, for the UE, a beam calibration criterion used for calibration of reciprocity between a receive beam and a transmit beam and/or a calibration threshold corresponding to the beam calibration criterion. For example, the beam calibration criterion may include at least one of a signal-to-noise ratio, received signal power corresponding to a beam, received signal quality corresponding to a beam, channel quality information (such as CQI) corresponding to a beam, a beam index, or a reference signal index. The received signal power corresponding to a beam may be specifically RSRP, and the received signal quality corresponding to a beam may be RSRQ, or the like. In addition, the channel state information corresponding to a beam may be channel state information CSI (Channel State Information, CSI for short) in LTE. For example, the CSI information may include at least one of a CRI, an RI, a PMI, and CQI. Alternatively, the channel state information corresponding to a beam may be channel quality information of RRM measurement, for example, at least one of RSRP and RSRQ. In addition, the channel state information may be any one or more pieces of other channel quality information different from the foregoing information, or may include any one or more pieces of other channel quality information in addition to the foregoing information. This embodiment of the present application imposes no limitation thereto.

The embodiments of the present application provide the beam calibration methods and mechanisms on the base station side and the user side, so as to implement fast and accurate beam calibration at the base station end and the UE end by using the mechanism, thereby simplifying a beam management process of the base station or UE, reducing a delay caused by beam scanning when there is a relatively large quantity of beams, and maximizing resource utilization efficiency.

By using the foregoing example, it can be learned that, after the terminal device sends the N first reference signals to the network device, the network device may further send the physical layer control signaling to the terminal device. The physical layer control signaling is used to trigger the network device to send the channel quality measurement result of the N first reference signals to the terminal device, and the physical layer control signaling is further used to instruct the network device to send the M second reference signals to the terminal device, so that the terminal device may perform beam calibration based on the channel quality measurement result of the N first reference signals that is sent according to the physical layer control signaling and based on a channel quality measurement result of the M second reference signals of the terminal device. Likewise, the network device may also perform corresponding beam calibration based on the foregoing information. Therefore, in this embodiment of the present application, fast beam calibration for the network device and the terminal device can be implemented, thereby simplifying a beam management process of the network device or the terminal device, and maximizing resource utilization efficiency.

It should be noted that, to make the description brief, the foregoing method embodiments are expressed as a series of actions. However, a person skilled in the art should appreciate that the present application is not limited to the described action sequence, because according to the present application, some steps may be performed in other sequences or performed simultaneously. In addition, a person skilled in the art should also appreciate that all the embodiments described in the specification are preferred embodiments, and the related actions and modules are not necessarily mandatory to the present application.

To better implement the foregoing solutions of the embodiments of the present application, the following further provides related apparatuses for implementing the foregoing solutions.

Figure 6:
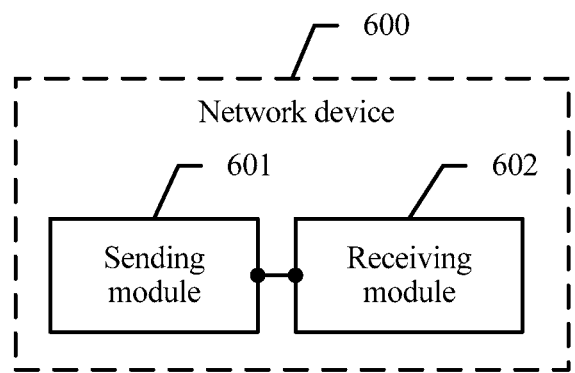
FIG. 6 is a schematic structural composition diagram of a network device according to an embodiment of the present application.

Referring to FIG. 6, a network device 600 provided in an embodiment of the present application may include a sending module 601 and a receiving module 602.

The sending module 601 is configured to send N first reference signals to a terminal device, where N is a positive integer greater than or equal to 1.

The sending module 601 is configured to send physical layer control signaling to the terminal device, where the physical layer control signaling is used to trigger the terminal device to send a channel quality measurement result of the N first reference signals to the network device, the physical layer control signaling is further used to instruct the terminal device to send M second reference signals to the network device, and M is a positive integer greater than or equal to 1.

The receiving module 602 is configured to: after the sending module sends the physical layer control signaling, receive the channel quality measurement result sent by the terminal device; and receive the M second reference signals sent by the terminal device.

In some embodiments of the present application, the channel quality measurement result received by the receiving module 602 includes a resource index of one of the N first reference signals.

In some embodiments of the present application, a moment n for sending the M second reference signals received by the receiving module 602 and a moment k for sending the channel quality measurement result received by the receiving module 602 meet the following condition:

n=k+m, where m is a positive integer greater than 0, or m is equal to 0, or m is a negative integer less than 0.

In some embodiments of the present application, a value of m is predefined; or a value of m is indicated to the terminal device by using higher layer signaling or the physical layer control signaling.

In some embodiments of the present application, transmission bandwidth of the second reference signal is less than or equal to transmission bandwidth of the first reference signal; and/or a frequency domain resource used for transmitting the second reference signal is a subset of a frequency domain resource used for transmitting the first reference signal.

In some embodiments of the present application, the receiving module 602 is specifically configured to receive the M second reference signals repeatedly sent by the terminal device in a time division mode.

Figure 7:
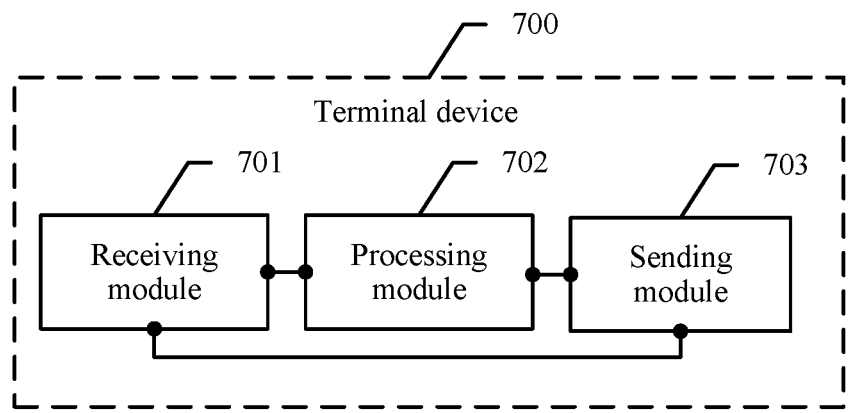
FIG. 7 is a schematic structural composition diagram of a terminal device according to an embodiment of the present application.

Referring to FIG. 7, a terminal device 700 provided in an embodiment of the present application may include a receiving module 701, a processing module 702, and a sending module 703.

The receiving module 701 is configured to receive N first reference signals sent by a network device, where N is a positive integer greater than or equal to 1.

The processing module 702 is configured to obtain a channel quality measurement result of the N first reference signals received by the receiving module.

The receiving module 701 is configured to receive physical layer control signaling sent by the network device, where the physical layer control signaling is used to trigger the terminal device to send the channel quality measurement result of the N first reference signals to the network device, the physical layer control signaling is further used to instruct the terminal device to send M second reference signals to the network device, and M is a positive integer greater than or equal to 1.

The sending module 703 is configured to: before or after the receiving module receives the physical layer control signaling, send the channel quality measurement result to the network device; and send the M second reference signals to the network device.

In some embodiments of the present application, a moment n for sending the M second reference signals by the sending module 703 and a moment k for sending the channel quality measurement result by the sending module 703 meet the following condition:

n=k+m, where m is a positive integer greater than 0, or m is equal to 0, or m is a negative integer less than 0.

In some embodiments of the present application, a value of m is predefined; or a value of m is indicated to the terminal device by using higher layer signaling or the physical layer control signaling.

In some embodiments of the present application, transmission bandwidth of the second reference signal is less than or equal to transmission bandwidth of the first reference signal; and/or a frequency domain resource used for transmitting the second reference signal is a subset of a frequency domain resource used for transmitting the first reference signal.

In some embodiments of the present application, the sending module 703 is specifically configured to repeatedly send the M second reference signals to the network device in a time division mode.

Figure 8:
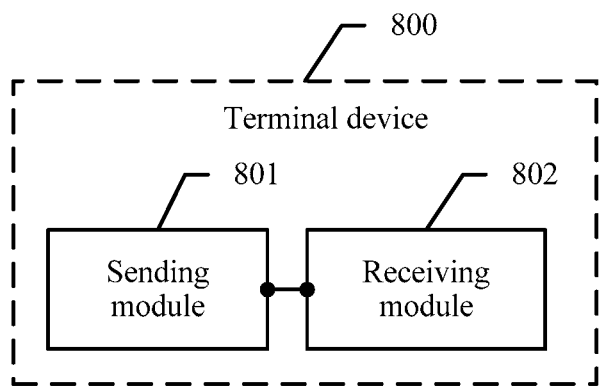
FIG. 8 is a schematic structural composition diagram of another terminal device according to an embodiment of the present application.

Referring to FIG. 8, a terminal device 800 provided in an embodiment of the present application may include a sending module 801 and a receiving module 802.

The sending module 801 is configured to send N first reference signals to a network device, where N is a positive integer greater than or equal to 1.

The receiving module 802 is configured to receive physical layer control signaling sent by the network device, where the physical layer control signaling is used to carry a channel quality measurement result, that is obtained by the network device, and that is of the N first reference signals sent by the sending module.

The receiving module 802 is configured to: receive the channel quality measurement result of the N first reference signals; and receive M second reference signals sent by the network device, where sending the M second reference signals is also triggered by the physical layer control signaling, and M is a positive integer greater than or equal to 1.

In some embodiments of the present application, the channel quality measurement result includes a resource index of one of the N first reference signals.

In some embodiments of the present application, a moment n for sending the M second reference signals and a moment k for sending the channel quality measurement result meet the following condition:

n=k+m, where m is a positive integer greater than 0, or m is equal to 0, or m is a negative integer less than 0.

In some embodiments of the present application, a value of m is predefined; or a value of m is indicated to the terminal device by using higher layer signaling or the physical layer control signaling.

In some embodiments of the present application, the terminal device further includes a processing module 803.

The receiving module 802 is configured to receive a beam calibration criterion configured by the network device and/or a calibration threshold corresponding to the beam calibration criterion.

The processing module 803 is configured to perform beam calibration based on the channel quality measurement result of the N first reference signals that is received by the receiving module and based on a channel quality measurement result of the M second reference signals, by using the beam calibration criterion received by the receiving module and/or the calibration threshold that corresponds to the beam calibration criterion and that is received by the receiving module.

In some embodiments of the present application, the sending module 801 is configured to report, to the network device, a result obtained after the processing module performs beam calibration.

In some embodiments of the present application, transmission bandwidth of the second reference signal is greater than or equal to transmission bandwidth of the first reference signal; and/or a frequency domain resource used for transmitting the first reference signal is a subset of a frequency domain resource used for transmitting the second reference signal.

In some embodiments of the present application, the receiving module 802 is specifically configured to receive the M second reference signals repeatedly sent by the network device in a time division mode.

Figure 9:
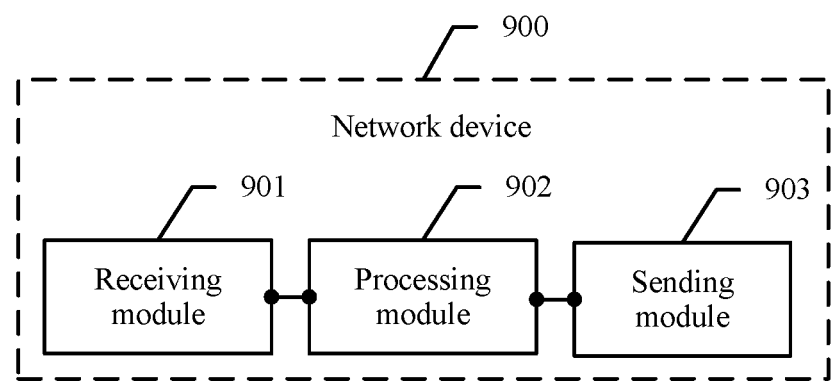
FIG. 9 is a schematic structural composition diagram of another network device according to an embodiment of the present application.

Referring to FIG. 9, a network device 900 provided in an embodiment of the present application may include a receiving module 901, a processing module 902, and a sending module 903.

The receiving module 901 is configured to receive N first reference signals sent by a terminal device, where N is a positive integer greater than or equal to 1.

The processing module 902 is configured to obtain a channel quality measurement result of the N first reference signals received by the receiving module.

The sending module 903 is configured to send physical layer control signaling to the terminal device, where the physical layer control signaling is used to carry the channel quality measurement result of the N first reference signals that is obtained by the obtaining module.

The sending module 903 is configured to send M second reference signals to the terminal device, where sending the M second reference signals by the network device is also triggered by the physical layer control signaling, and M is a positive integer greater than or equal to 1.

In some embodiments of the present application, a moment n for sending the M second reference signals by the sending module 903 and a moment k for sending the channel quality measurement result meet the following condition:

n=k+m, where m is a positive integer greater than 0, or m is equal to 0, or m is a negative integer less than 0.

In some embodiments of the present application, a value of m is predefined; or a value of m is indicated to the terminal device by using higher layer signaling or the physical layer control signaling.

In some embodiments of the present application, the receiving module 901 is configured to: after the sending module sends the M second reference signals to the terminal device, receive a result that is reported by the terminal device and that is obtained after the terminal device performs beam calibration.

In some embodiments of the present application, transmission bandwidth of the second reference signal is greater than or equal to transmission bandwidth of the first reference signal; and/or a frequency domain resource used for transmitting the first reference signal is a subset of a frequency domain resource used for transmitting the second reference signal.

In some embodiments of the present application, the sending module 903 is specifically configured to repeatedly send the M second reference signals to the terminal device in a time division mode.

It should be noted that, content such as information exchange between the modules/units of the foregoing apparatus and an execution process based on a same idea as the method embodiments of the present application; therefore, technical effects thereof are the same as those in the method embodiments of the present application. For specific content, refer to the descriptions in the method embodiments of the present application that is shown above. Details are not described herein again.

An embodiment of the present application further provides a computer storage medium, where the computer storage medium stores a program, and executing the program includes a part or all of the steps described in the foregoing method embodiments.

Figure 10:
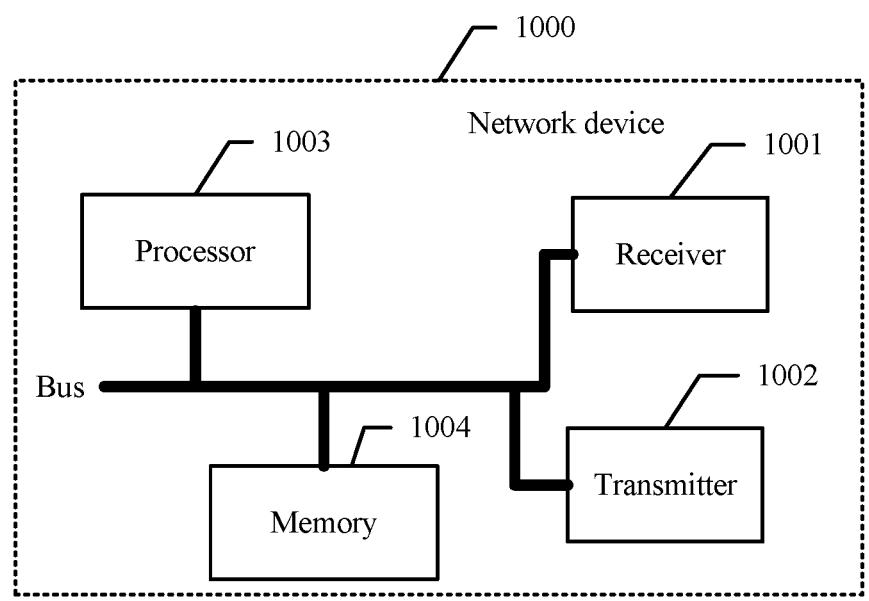
FIG. 10 is a schematic structural composition diagram of another terminal device according to an embodiment of the present application.

The following describes another network device provided in an embodiment of the present application. Referring to FIG. 10, a network device 1000 includes:

a receiver 1001, a transmitter 1002, a processor 1003, and a memory 1004 (there may be one or more processors 1003 in the network device 1000, and one processor is used as an example in FIG. 10). In some embodiments of the present application, the receiver 1001, the transmitter 1002, the processor 1003, and the memory 1004 may be connected by using a bus or in another manner, and the connection by using a bus is used as an example in FIG. 10.

The memory 1004 may include a read-only memory and a random access memory, and provide the processor 1003 with an instruction and data. A part of the memory 1004 may further include a nonvolatile random access memory (English full name: Non-Volatile Random Access Memory, NVRAM for short). The memory 1004 stores an operating system and an operation instruction, an executable module or a data structure, or a subset thereof, or an extended set thereof. The operation instruction may include various operation instructions, so as to implement various operations. The operating system may include various system programs, so as to implement various basic services and process hardware-based tasks.

The processor 1003 controls operations of the network device. The processor 1003 may also be referred to as a central processing unit (English full name: Central Processing Unit, CPU for short). In specific application, components of the network device are coupled together by using a bus system. In addition to a data bus, the bus system may further include a power bus, a control bus, a status signal bus, and the like. However, for clarity of description, various buses are referred to as the bus system in the figure.

The methods disclosed in the foregoing embodiments of the present application may be applied to the processor 1003, or implemented by the processor 1003. The processor 1003 may be an integrated circuit chip and has a signal processing capability. In an implementation process, each step of the foregoing method may be completed by using an integrated logical circuit of hardware in the processor 1003 or an instruction in a form of software. The processor 1003 may be a general purpose processor, a digital signal processor (English full name: Digital Signal Processor, DSP for short), an application-specific integrated circuit (English full name: Application Specific Integrated Circuit, ASIC for short), a field-programmable gate array (English full name: Field-Programmable Gate Array, FPGA for short) or another programmable logic device, a discrete gate or transistor logic device, or a discrete hardware component. All methods, steps, and logical block diagrams disclosed in this embodiment of the present application may be implemented or performed. The general purpose processor may be a microprocessor or the processor may be any conventional processor, or the like. Steps of the methods disclosed in the embodiments of the present application may be directly performed and completed by a hardware decoding processor, or may be performed and completed by using a combination of hardware in the decoding processor and a software module. The software module may be located in a mature storage medium in the field, such as a random access memory, a flash memory, a read-only memory, a programmable read-only memory, an electrically-erasable programmable memory, or a register. The storage medium is located in the memory 1004, and the processor 1003 reads information in the memory 1004 and implements the steps of the foregoing method in combination with hardware of the processor 1003.

The receiver 1001 may be configured to: receive entered digital or character information, and generate signal input related to a related setting and function control of the network device. The transmitter 1002 may include a display device such as a display screen, and the transmitter 1002 may be configured to output digital or character information by using an external interface.

In this embodiment of the present application, the processor 1003 is configured to execute the signal transmission method performed on a network device side.

Figure 11:
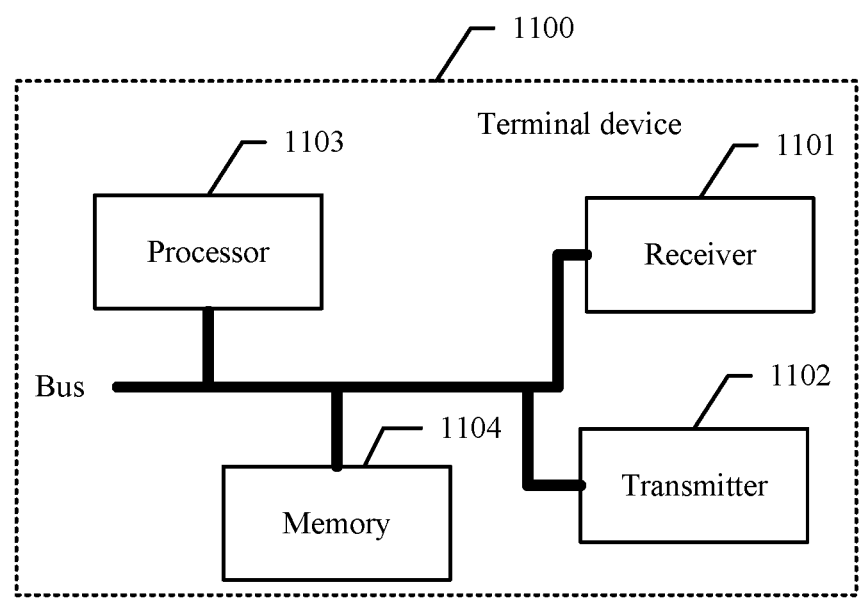
FIG. 11 is a schematic structural composition diagram of another network device according to an embodiment of the present application.

The following describes another terminal device provided in an embodiment of the present application. Referring to FIG. 11, a terminal device 1100 includes:

a receiver 1101, a transmitter 1102, a processor 1103, and a memory 1104 (there may be one or more processors 1103 in the terminal device 1100, and one processor is used as an example in FIG. 11). In some embodiments of the present application, the receiver 1101, the transmitter 1102, the processor 1103, and the memory 1104 may be connected by using a bus or in another manner, and the connection by using a bus is used as an example in FIG. 11.

The memory 1104 may include a read-only memory and a random access memory, and provide the processor 1103 with an instruction and data. A part of the memory 1104 may further include an NVRAM. The memory 1104 stores an operating system and an operation instruction, an executable module or a data structure, or a subset thereof, or an extended set thereof. The operation instruction may include various operation instructions, so as to implement various operations. The operating system may include various system programs, so as to implement various basic services and process hardware-based tasks.

The processor 1103 controls operations of the terminal device, and the processor 1103 may also be referred to as a CPU. In specific application, components of the terminal device are coupled together by using a bus system. In addition to a data bus, the bus system may further include a power bus, a control bus, a status signal bus, and the like. However, for clarity of description, various buses are referred to as the bus system in the figure.

The methods disclosed in the foregoing embodiments of the present application may be applied to the processor 1103, or implemented by the processor 1103. The processor 1103 may be an integrated circuit chip and has a signal processing capability. In an implementation process, each step of the foregoing method may be completed by using an integrated logical circuit of hardware in the processor 1103 or an instruction in a form of software. The processor 1103 may be a general purpose processor, a DSP, an ASIC, an FPGA or another programmable logic device, a discrete gate or transistor logic device, or a discrete hardware component. All methods, steps, and logical block diagrams disclosed in this embodiment of the present application may be implemented or performed. The general purpose processor may be a microprocessor or the processor may be any conventional processor, or the like. Steps of the methods disclosed in the embodiments of the present application may be directly performed and completed by a hardware decoding processor, or may be performed and completed by using a combination of hardware in the decoding processor and a software module. The software module may be located in a mature storage medium in the field, such as a random access memory, a flash memory, a read-only memory, a programmable read-only memory, an electrically-erasable programmable memory, or a register. The storage medium is located in the memory 1104, and the processor 1103 reads information in the memory 1104 and implements the steps of the foregoing method in combination with hardware of the processor 1103.

In this embodiment of the present application, the processor 1103 is configured to execute the signal transmission method performed on a terminal device side.

In addition, it should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided in the present application, connection relationships between modules indicate that the modules have communication connections with each other, which may be specifically implemented as one or more communications buses or signal cables.

Based on the description of the foregoing implementations, a person skilled in the art may clearly understand that the present application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present application, software program implementation is a better implementation in most cases. Based on such an understanding, the technical solutions of the present application essentially or the part contributing to the prior art may be implemented in a form of a software product. The computer software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of the present application.

What is claimed is:

1. A signal transmission method, comprising:
   receiving, by a terminal device and from a network device, an indication information, wherein the indication information is used to indicate an association between transmitting M second reference signals and a resource index of a first reference signal, wherein the first reference signal is sent by the network device to the terminal device, wherein M is a positive integer greater than or equal to 1, and wherein according to the association, a formed transmit beam for the M second reference signals is the same as a formed receive beam for the first reference signal;
   receiving, by the terminal device, physical layer control signaling and from the network device, wherein the physical layer control signaling is used to indicate the terminal device transmitting one or more second reference signal to the network device; and
   transmitting, by the terminal device, one or more second reference signal to the network device.

2. The method according to claim 1, wherein the method comprises:
   transmitting, by the terminal device, an indication information indicating that reciprocity between a receive beam and a transmit beam on the terminal device side stands to the network device.

3. The method according to claim 1, wherein the method comprises:
   receiving, by the terminal device, physical layer control signaling and from the network device, wherein the physical layer control signaling is used to trigger the terminal device to transmit a channel quality measurement result of N first reference signals to the network device, and wherein N is a positive integer greater than or equal to 1.

4. The method according to claim 3, wherein the channel quality measurement result comprises the resource index of the first reference signal from the N first reference signals.

5. A signal transmission method, comprising:
receiving, by a terminal device and from a network device, N first reference signals, wherein N is a positive integer greater than or equal to 1;
obtaining, by the terminal device, a channel quality measurement result of the N first reference signals;
receiving, by the terminal device and from the network device, physical layer control signaling, wherein the physical layer control signaling is used to trigger the terminal device to transmit the channel quality measurement result of the N first reference signals to the network device, wherein the physical layer control signaling is further used to instruct the terminal device to transmit M second reference signals to the network device, and wherein M is a positive integer greater than or equal to 1;
transmitting, by the terminal device, the channel quality measurement result to the network device;
transmitting, by the terminal device, the M second reference signals to the network device; and
receiving, by the terminal device, an indication information from the network device, wherein the indication information is used to indicate an association between transmitting the M second reference signals and the channel quality measurement result of the N first reference signal, and wherein a formed transmit beam for the M second reference signals is the same as a formed receive beam for one of the N first reference signal.

6. The method according to claim 5, wherein the channel quality measurement result comprises a resource index of one of the N first reference signals.

7. The method according to claim 5, wherein at least one of:
transmission bandwidth of the second reference signal is less than or equal to transmission bandwidth of the first reference signal; or
a frequency domain resource used for transmitting the second reference signal is a subset of a frequency domain resource used for transmitting the first reference signal.

8. The method according to claim 5, wherein a moment n for transmitting the M second reference signals and a moment k for transmitting the channel quality measurement result meet the following condition:
n=k+m, wherein:
m is a positive integer greater than 0, or m is equal to 0, or m is a negative integer less than 0.

9. The method according to claim 5, wherein the method comprises:
transmitting, by the terminal device, an indication information indicating whether reciprocity between a receive beam and a transmit beam on the terminal device side stands to the network device.

10. A network device, comprising at least one processor coupled to a memory and configured to read an instruction in the memory to cause the network device to:
transmit N first reference signals to a terminal device, wherein N is a positive integer greater than or equal to 1;
transmit physical layer control signaling to the terminal device, wherein the physical layer control signaling is used to trigger the terminal device to transmit a channel quality measurement result of the N first reference signals to the network device, wherein the physical layer control signaling is further used to instruct the terminal device to transmit M second reference signals to the network device, and wherein M is a positive integer greater than or equal to 1;
after transmitting the physical layer control signaling, receive the channel quality measurement result sent by the terminal device;
receive the M second reference signals sent by the terminal device; and
transmit an indication information to the terminal device, wherein the indication information is used to indicate an association between transmitting the M second reference signals and the channel quality measurement result of the N first reference signal, and wherein a formed transmit beam for the M second reference signals is the same as a formed receive beam for one of the N first reference signal.

11. The network device according to claim 10, wherein at least one of:
transmission bandwidth of the second reference signal is less than or equal to transmission bandwidth of the first reference signal; or
a frequency domain resource used for transmitting the second reference signal is a subset of a frequency domain resource used for transmitting the first reference signal.

12. The network device according to claim 10, wherein a moment n for transmitting the M second reference signals received by the network device and a moment k for transmitting the channel quality measurement result received by the network device meet the following condition:
n=k+m, wherein:
m is a positive integer greater than 0, or m is equal to 0, or m is a negative integer less than 0.

13. The network device according to claim 10, wherein the channel quality measurement result comprises a resource index of one of the N first reference signals.

14. The network device according to claim 10, wherein the at least one processor coupled to a memory and configured to read an instruction in the memory to cause the network device to:
receive an indication information indicating whether reciprocity between a receive beam and a transmit beam on the terminal device side stands to the network device.

15. A terminal device, comprising at least one processor coupled to a memory and configured to read an instruction in the memory to cause the terminal device to:
receive an indication information from a network device, wherein the indication information is used to indicate an association between transmitting M second reference signals and a resource index of a first reference signal, wherein the first reference signal is sent by the network device to the terminal device, wherein M is a positive integer greater than or equal to 1, and wherein according to the association, a formed transmit beam for the M second reference signals is the same as a formed receive beam for the first reference signal;
receive physical layer control signaling from the network device, wherein the physical layer control signaling is used to indicate the terminal device transmitting one or more second reference signal to the network device; and transmit one or more second reference signal to the network device.

16. The terminal device according to claim 15, wherein the at least one processor coupled to a memory and configured to read an instruction in the memory to cause the terminal device to:
transmit an indication information indicating that reciprocity between a receive beam and a transmit beam on the terminal device side stands to the network device.

17. The terminal device according to claim 15, wherein the at least one processor coupled to a memory and configured to read an instruction in the memory to cause the terminal device to:
receive physical layer control signaling from the network device, wherein the physical layer control signaling is used to trigger the terminal device to transmit a channel quality measurement result of N first reference signals to the network device, and wherein N is a positive integer greater than or equal to 1.

18. The terminal device according to claim 17, wherein the channel quality measurement result comprises the resource index of the first reference signal from the N first reference signals.

19. A terminal device, comprising at least one processor coupled to a memory and configured to read an instruction in the memory to cause the terminal device to:
receive N first reference signals sent by a network device, wherein N is a positive integer greater than or equal to 1;
obtain a channel quality measurement result of the N first reference signals;
receive physical layer control signaling sent by the network device, wherein the physical layer control signaling is used to trigger the terminal device to transmit the channel quality measurement result of the N first reference signals to the network device, wherein the physical layer control signaling is further used to instruct the terminal device to transmit M second reference signals to the network device, and wherein M is a positive integer greater than or equal to 1;
before or after receiving the physical layer control signaling, transmit the channel quality measurement result to the network device;
transmit the M second reference signals to the network device; and
receive an indication information from the network device, wherein the indication information is used to indicate an association between transmitting the M second reference signals and the channel quality measurement result of the N first reference signal, and wherein a formed transmit beam for the M second reference signals is the same as a formed receive beam for one of the N first reference signal.

20. The terminal device according to claim 19, wherein the channel quality measurement result comprises a resource index of one of the N first reference signals.

21. The terminal device according to claim 19, wherein the at least one processor coupled to a memory and configured to read an instruction in the memory to cause the terminal device to:
transmit an indication information indicating whether reciprocity between a receive beam and a transmit beam on the terminal device side stands to the network device.

22. The terminal device according to claim 19, wherein a moment n for transmitting the M second reference signals by the terminal device and a moment k for transmitting the channel quality measurement result by the terminal device meet the following condition:
n=k+m, wherein:
m is a positive integer greater than 0, or m is equal to 0, or m is a negative integer less than 0.

23. The terminal device according to claim 19, wherein at least one of:
transmission bandwidth of the second reference signal is less than or equal to transmission bandwidth of the first reference signal; or
a frequency domain resource used for transmitting the second reference signal is a subset of a frequency domain resource used for transmitting the first reference signal.

24. A non-transitory computer readable storage medium, comprising a computer program stored thereon which, when executed by a computer, causes the computer to:
receive N first reference signals sent by a network device, wherein N is a positive integer greater than or equal to 1;
obtain a channel quality measurement result of the N first reference signals;
receive physical layer control signaling sent by the network device, wherein the physical layer control signaling is used to trigger the computer to transmit the channel quality measurement result of the N first reference signals to the network device, wherein the physical layer control signaling is further used to instruct the computer to transmit M second reference signals to the network device, and wherein M is a positive integer greater than or equal to 1;
transmit the channel quality measurement result to the network device;
transmit the M second reference signals to the network device; and
receive an indication information from the network device, wherein the indication information is used to indicate an association between transmitting the M second reference signals and the channel quality measurement result of the N first reference signal, and wherein a formed transmit beam for the M second reference signals is the same as a formed receive beam for one of the N first reference signal.

25. The non-transitory computer readable storage medium according to claim 24, wherein the channel quality measurement result comprises a resource index of one of the N first reference signals.

26. The non-transitory computer readable storage medium according to claim 24, wherein the computer program stored thereon which, when executed by a computer, causes the computer to:
transmit an indication information indicating whether reciprocity between a receive beam and a transmit beam on the terminal device side stands to the network device.

27. The non-transitory computer readable storage medium according to claim 24, wherein a moment n for transmitting the M second reference signals and a moment k for transmitting the channel quality measurement result meet the following condition:
n=k+m, wherein:
m is a positive integer greater than 0, or m is equal to 0, or m is a negative integer less than 0.

28. The non-transitory computer readable storage medium according to claim 24, wherein at least one of:

transmission bandwidth of the second reference signal is less than or equal to transmission bandwidth of the first reference signal; or a frequency domain resource used for transmitting the second reference signal is a subset of a frequency domain resource used for transmitting the first reference signal.

\* \* \* \* \*